United States Patent Office 3,669,699
Patented June 13, 1972

3,669,699
INORGANIC COATING COMPOSITION
Kazuo Doi, Osaka, Jun Nakajima, Kyoto, Hisamitsu Takahashi, Hirakata, and Hideo Tomokawa, Neyagawa, Japan, assignors to Matsushita Electric Works, Ltd., Oaza Kadoma, Kadoma, Japan
No Drawing. Filed July 28, 1970, Ser. No. 59,032
Claims priority, application Japan, July 31, 1969, 44/61,307
Int. Cl. C09d 1/02; C09j 1/02
U.S. Cl. 106—74      7 Claims

ABSTRACT OF THE DISCLOSURE

An inorganic coating composition is provided which comprises (1) a weak alkaline aqueous solution of an alkali metal silicate and (2) at least one condensed phosphate prepared by heating a mixture of (A) a phosphate having an average composition formula:

$$MO \cdot xP_2O_5 \cdot yH_2O$$

wherein M represents a metal selected from the group consisting of Al, Mg, Ca, Cu, Fe, Mn and Zn, the atomic ratio $M/P$ is 0.25–1.0, each of $x$ and $y$ is a real number and (B) a calcinated double oxide of (a) a metal selected from Group II of the Periodic Table or (b) at least one metal selected from transition metals and metals of Group IV of the Periodic Table.

---

This invention relates to an inorganic coating composition and also to a method of forming a protective coating on a substrate.

It is known to form a protective or corrosion-resistant coating on a substrate such as metal or wood. Most of the conventional protective and/or anti-corrosive coatings of this kind are organic such as asphalt, synthetic resins or the like. These organic coatings have various drawbacks in that they are inflammable, low in thermal resistance, poor in hardness and not fully satisfactory in water-resistance. Further, prior to providing such organic coating, the metal surface must be cleaned to remove rust. Even when an organic coating composition is applied on a rust-free clean metal surface or wood surface, it is difficult to obtain a firmly adherent coating. This is particularly true when a metal is to be coated.

Therefore it is an object of this invention to provide an inorganic coating which is excellent in protective and water-resistant properties and is firmly adherent to the surface of a substrate.

Another object of this invention is to provide an inorganic coating which is hard, inflammable and high in resistance to heat, water and weather.

Still another object of this invention is to provide a protective and anti-corrosive coating which is firmly adherent to a metal surface even when the metal surface is not cleaned prior to applying the coating composition.

Other objects, features and advantages of this invention will be apparent from the following description.

Briefly, the present invention provides an inorganic coating composition which comprises (1) a weakly alkaline aqueous solution of alkali metal silicates, preferably water glass, and (2) at least one condensed phosphate prepared by heating a mixture of (A) a phosphate having an average composition formula:

$$MO \cdot xP_2O_5 \cdot yH_2O \qquad (I)$$

wherein M represents a metal selected from the group consisting of Al, Mg, Ca, Cu, Fe, Mn and Zn, the atomic ratio $M/P$ is 0.25–1.0, each of $x$ and $y$ is a real number and (B) an inorganic metal compound selected from the group consisting of (i) hydroxides of metals belonging to Groups I and II of Periodic Table, (ii) weak basic metal oxides and (iii) calcinated double oxides comprising (a) a mixture of oxide(s) of metal(s) belonging to Group II of Periodic Table and oxide(s) of metal(s) belonging to Group IV of Periodic Table, (b) a mixture of oxide(s) of metal(s) belonging to Group II and at least oxide of a metal selected from silicon, aluminum, antimony and bismuth or (c) a mixture of two or more oxides of transition metals.

As mentioned above the liquid phosphate to be used in this invention is represented by the following formula:

$$MO \cdot xP_2O_5 \cdot yH_2O$$

wherein M is a metal selected from the group consisting of Ca, Mg, Al, Cu, Fe, Mn and Zn, the atomic ratio $M/P$ is 0.25–1.0, and each of $x$ and $y$ is a real number. The value x may be determined from $0.25 \leq M/P \leq 1.0$, but the value y varies depending upon the particular product and ambient moisture condition because the degree of hydration varies. Thus the phosphate may be one or a mixture of two or more of the commercially available primary phosphates of Ca, Mg, Al, Cu, Fe, Mn and Zn. If desired, the primary phosphate may be mixed with one or more of the secondary phosphates such as $2Al_2O_3 \cdot 3P_2O_5 \cdot 3H_2O$, $2CaO \cdot P_2O_5 \cdot H_2O$, $2MgO \cdot P_2O_5 \cdot H_2O$, etc.; sesquiphosphates such as $Al_2O_3 \cdot 2P_2O_5 \cdot 3H_2O$; and $CaH_2P_2O_7$, etc. Even in the form of mixture, it should satisfy the above formula.

According to this invention the above mentioned phosphate is mixed and reacted with an inorganic metal compound and then the resulting product is heated to form a "condensed phosphate."

As for the inorganic metal compounds there may be used various metal hydroxides and oxides which are basic and therefore may neutralize the phosphate.

One group of such inorganic metal compounds is hydroxides of metals belonging to Groups I and II of Periodic Table. Typical examples of such hydroxides are lithium hydroxide, sodium hydroxide, potassium hydroxide, copper hydroxide, magnesium hydroxide, calcium hydroxide, zinc hydroxide, strontium hydroxide and barium hydroxide.

Another group of such inorganic metal compounds is weakly basic metal oxides. More particularly examples of such oxides are $Al_2O_3$, $BaO$, $TiO_2$, $ZnO_2$, $Cr_2O_3$, $MnO_2$, $FeO$, $Fe_3O_4$ and $Fe_2O_3$.

Still another group of such inorganic metal compounds is calcinated double oxides of various metals. Thus, the double oxide may be those obtained by the calcination of a mixture of at least one oxide of a metal belonging to Group II of the Periodic Table and at least one oxide of a metal belonging to Group IV of the Periodic Table. The metal oxides are mixed in such proportions that they may form a double oxide. The oxide mixture may be calcinated at a temperature of about 200–1300° C. for about 1–5 hours or more depending upon the particular oxide mixture.

Examples of oxides of metals of Group II of the Periodic Table are magnesium oxide, calcium oxide, zinc oxide, strontium oxide, cadmium oxide, barium oxide, etc. Examples of oxides of metals of Group IV of the Periodic Table are silicon oxide, titanium oxide, zirconium oxide, tin oxide, lead oxide, etc.

It is also possible to employ a double oxide prepared by the calcination of a mixture of at least one oxide of a metal belonging to Group II of the Periodic Table and at least one oxide selected from the group consisting of silicon oxide, aluminum oxide, antimony oxide and bismuth oxide. The calcination may be conducted in the same manner as mentioned above.

It is also possible to employ a calcinated double oxide prepared by the calcination of a mixture of oxides of transition metals, for example, oxides of iron, cobalt, nickel, titanium, manganese, zinc and chromium. Thus a mixture (in any proportion) of two or more of these metal oxides is calcinated. The conditions under which the calcination is carried out are not critical so far as volatiles in the oxide are removed and the oxide is activated. For example, the calcination may be conducted in an electric furnace at a temperature of about 200° C. to 1300° C. for about 1 to 5 hours depending on the particular oxide.

After the calcination the oxide may be pulverized. Of course, it is possible to employ those metal compounds such as carbonates, hydroxides, etc. which would be converted into oxides during the calcination to form the double oxides.

It is also possible to employ a mixture of metal compounds which are converted into a double oxide during the calcination. Thus, for example, it is possible to coprecipate two metals in an insoluble form such as oxalate, carbonate, hydroxide or oxide from an aqueous solution containing these metals in a soluble form such as nitrate, sulfate, etc. Thus, for example, aqueous ammonia or aqueous solution of sodium hydroxide may be added to an aqueous solution containing iron sulfate and zinc sulfate to coprecipitate iron hydroxide and zinc hydroxide. The precipitate is recovered and calcinated in the manner as described above to prepare the desired double oxide. When necessary, the calcinated oxide product is pulverized.

Since the calcinated oxide powders may be different in color depending upon the particular metal, suitable metal oxide or a mixture of metal oxides may be selected depending upon the color desired in the final protective coating.

The above mentioned phosphate and inorganic metal compound are mixed together to cause a reaction (at least partial neutralization of the phosphate with the basic metal compound) and the resulting product is heated or dried.

Generally, the inorganic metal compound is used in an amount of 0.2–1.5 parts by weight per part of the phosphate. The heat treatment conditions may vary over a wide range depending upon the particular apparatus (type of furnace) and particle size of the materials to be heated. However, generally the mixture is heated at a temperature of 120–150° C. for 30 minutes to 10 hours, preferably 2–7 hours.

After the heat treatment or calcination the resulting solid mass (condensed phosphate) is pulverized into fine powder.

The condensed phosphate powder is then mixed with a weak alkaline aqueous solution of an alkali metal silicate such as water glass (sodium silicate). Other alkali metal silicates which may be mentioned are lithium silicate and potassium silicate. In the aqueous group consisting of water glass and aqueous solutions of solution of alkali metal silicate the solid content should be 0.3–1.5 parts by weight per part of the condensed phosphate. Further the amount of water may range from 1 to 2 parts by weight per part of the condensed phosphate.

If desired, an inorganic filler may be added. Examples of fillers which may be used are clay (bentonite), sand, calcium carbonate, gypsum, furnace waste, etc. The filler may be added in an amount of 30% by weight or less based on the total amount of the solid component in the composition.

The aqueous coating composition which is in the form of slurry or paste may be applied to the surface of an article to be protected in any suitable manner such as spraying, brush-painting, roller-coating, airless-spraying, etc. In case of a metal it is not necessary to clean and remove rust on the metal surface, although it is preferable to remove loose rust scale, before applying the coating composition.

The coating composition of this invention is curable at the room temperature but it takes a long time to cure at the normal temperature. In order to promote cure it is preferable to effect moisture-cure or thermal cure. Thus the coated article may be allowed to stand in an atmosphere of a relative humidity of 60–100% for 24 hours or longer (e.g. 3–5 days) until satisfactory curing occurs. The temperature may be 20–100° C. However, in order to promote the moisture-cure it is preferable to employ a hot atmosphere up to 100° C. Generally, the higher the reactive humidity the lower the temperature may be.

Alternatively the coating may be cured by heating. Thus, for example, the coated article may be heated at a temperature of 100° C. to 200° C. in a normal or open atmosphere. Generally the higher the temperature the shorter the time of the heat treatment may be.

The feature of the coating composition of this invention is that the pot-life is long.

By the above curing treatment, the coated composition is set or cured and becomes a hard, firmly adherent, water-resistant anti-corrosive coating on the surface of an article. Even if the coating composition is applied on a rusty ferrous metal surface, the rust would be converted into a magnetite during the curing reaction so as to form a layer firmly adherent to the base metal. The appearance of the coating is enamel or porcelain like. Further, the resulting coating is not only hard and anti-corrosive but also excellent in resistance to heat, flame, water and weather, and is stable for a prolonged period of time.

The coating composition of this invention is useful for the surface protection of any metallic or non-metallic article in any form such as sheets, plates, pipes, etc. The coating composition is also useful as a protective lining for pipes, vessels, etc. The coating composition is also useful in the surface protection of a wooden laminate, stone article, concrete article, slate, etc.

The invention will be illustrated in the following examples wherein all parts are by weight. In these examples, the hardness was determined by Barcol Impressor (ASTM D–2583–67).

EXAMPLE 1

A mixed phosphate ($M/P=0.5$) consisting of 6 parts of primary magnesium phosphate and 4 parts of primary aluminium phosphate was mixed with 10 parts of zinc oxide and the mixture was calcinated at 150° C. for 5 hours. The resulting condensed phosphate mass was pulverized and 10 parts thereof were mixed with 10 parts of water glass (solid content 50%) to obtain a coating composition. The coating composition was applied on the surface of a substrate. The thickness of the coated layer was 50 microns. The coated slate was allowed to stand at the room (20–25° C.) for one month. The resulting cured coating had the following properties:

Adherence: Cross-cut test 100/100, Scratch test 8
Hardness: Barcol hardness higher than 60
Wear-resistance: Tabor abraser 300, rounds base not exposed
Hot water resistance: >4 hours (boiling water)
Impact strength: 1 kg. weight dropped from 1 meter height but no peeling occurred

EXAMPLE 2

A mixed phosphate ($M/P=0.4$) consisting of 5 parts of primary aluminum phosphate, 1 part of primary calcium phosphate and 4 parts of primary magnesium phosphate was mixed with 3 parts of sodium hydroxide and the mixture was calcinated at 120° C. for 3 hours. The resulting condensed phosphate mass was pulverized into powder and 10 parts thereof were mixed with 7 parts of an aqueous solution of potassium silicate (solid content 50%) to form a coating composition. The coating composition was applied on an iron plate. The thickness of the coated layer was 50 microns. The coated iron plate was heated at 140° C. for 30 minutes to cure the coating. The properties of the resulting cured coating are as follows:

Adherence: Cross-cut test 100/100, Scratch test 8
Hardness: Barcol hardness 45
Wear-resistance: Tabor abraser 200 rounds, base not exposed
Hot water resistance: 2-hour (boiling water)
impact strength: 1 kg. weight dropped from 1 meter height but no peeling occurred The above coating composition was nearly colorless and transparent and therefore it could be colored in a desired color by adding a pigment thereto.

EXAMPLE 3

A mixed phosphate ($M/P=0.35$) consisting of 9 parts of primary aluminum phosphate and 1 part of primary calcium phosphate was mixed with a double oxide (prepared by mixing equal amounts of zinc oxide and ferric oxide and calcinating at 1000° C. for 2 hours) and calcium hydroxides, in proportions of 10(phosphate:10-(double oxide):1(calcium hydroxide). The mixture was heated to dry at 200° C. for 1 hour to obtain condensed phosphate. The resulting condensed phosphate was pulverized into powder and 10 parts of this powder were mixed with 20 parts of water glass (solid content 50%) to prepare a coating composition. The coating composition was applied on a slate to form a coated layer of 50 microns in thickness. The coated slate was left to stand in steam atmosphere at 50° C. for 24 hours. The properties of the resulting cured coating are as follows:

Adherence: Cross-cut test 100/100, Scratch test 10
Hardness: Barcol hardness 60
Wear-resistance: Tabor abraser 300 rounds, base not exposed
Hot water resistance: 2 hours (boiling water)
Impact strength: 1 kg. weight dropped from 1 meter height but no peeling occurred The above coating composition is excellent in adherence particularly to an article made from a cement.

EXAMPLE 4

A mixed phosphate ($M/P=0.37$) consisting of 7 parts of primary aluminum phosphate, 2 parts of aluminum sesquiphosphate and 1 parts of primary copper phosphate was mixed with a double oxide (prepared by mixing equal amounts of vanadium oxide and barium oxide and calcinating at 900° C. for one hour) and portland cement in proportions of 10(phosphate):5(double oxide):1-(portland cement). The mixture was heated to dry at 200° C. for 1 hour to form condensed phosphate. The condensed phosphate was pulverized into powder and 10 parts thereof were mixed with 20 parts of 50% aqueous solution of sodium silicate to prepare a coating composition. The coating composition was applied on a slate to form a coated layer of 50 microns in thickness. The coated slate was left to stand in atmospheric condition for one month. The properties of the resulting cured coating are as follows:

Adherence: Cross-cut test 100/100, Scratch test 8
Hardness: Barcol 60
Wear-resistance: Tabor abraser 300 rounds, base not exposed
Hot water resistance: 2 hours (boiling water)
Impact strength: 1 kg. weight dropped from 1 meter height but no peeling occurred

What we claim is:

1. An inorganic coating composition which comprises
(1) a weak alkaline aqueous solution of an alkali metal silicate and
(2) at least one condensed phosphate prepared by heating at a temperature up to about 150° C. a mixture of
   (A) a phosphate having an average composition formula:

$$MO \cdot xP_2O_5 \cdot yH_2O$$

wherein M represents a metal selected from the group consisting of Al, Mg, Ca, Cu, Fe, Mn and Zn, the atomic ratio $M/P$ is 0.25-1.0, each of $x$ and $y$ is a real number and
   (B) a calcinated double oxide of (a) a metal selected from Group II of the Periodic Table or (b) at least one metal selected from transition metals and metals of Group IV of the Periodic Table.

2. An inorganic coating composition of claim 1 which comprises
(1) a weak alkaline aqueous solution of an alkali metal silicate and
(2) at least one condensed phosphate prepared by heating at a temperature of about 120°–150° C. for a period of from 30 minutes to 10 hours a mixture of
   (A) a phosphate having an average composition formula:

$$MO \cdot xP_2O_5 \cdot yH_2O$$

wherein M represents a metal selected from the group consisting of Al, Mg, Ca, Cu, Fe, Mn and Zn, the atomic ratio $M/P$ is 0.25-1.0, each of $x$ and $y$ is a real number and
   (B) a calcinated double oxide of (a) a metal selected from Group II of the Periodic Table or (b) at least one metal selected from transition metals and metals of Group IV of the Periodic Table, the weight ratio $(A):(B)$ being from about 5:1 to about 2:3, the amount of component (1) being about 0.3 to about 1.5 parts solid weight per part of component (2), and the water content of said aqueous solution is about 1 to 2 parts by weight per part of said component (2).

3. An inorganic coating composition of claim 1, wherein said alkali metal silicate is water glass.

4. A method of producing a coating which is hard, inflammable, highly heat-, water- and weather-resistant, and anti-corrosive, which comprises (a) applying an inorganic coating composition of claim 1 to said substrate; and (b) curing said inorganic coating composition to provide a coated surface which is hard, inflammable, highly heat-, water- and weather-resistant, and anti-corrosive.

5. The method of claim 4, wherein said curing (b) is accomplished by allowing said inorganic coating composition to stand under atmospheric conditions.

6. The method of claim 4, wherein said curing (b) is accomplished by allowing said inorganic coating composition to stand in an atmosphere of a relative humidity of 60-100% for at least 24 hours at a temperature of 20–100° C.

7. The method of claim 4, wherein said curing (b) is accomplished by heating at a temperature of 100-200° C.

References Cited
UNITED STATES PATENTS 3,445,257    5/1969    Hloch et al.    106—84

JAMES E. POER, Primary Examiner

U.S. Cl. X.R.

106—84